(12) United States Patent
Wittelsbuerger et al.

(10) Patent No.: US 10,883,300 B2
(45) Date of Patent: Jan. 5, 2021

(54) DRIVE ASSEMBLY OF A CLOSURE ELEMENT ASSEMBLY

(71) Applicant: Brose Fahrzeugteile GmbH & Co. Kommanditgesellschaft, Bamberg, Bamberg (DE)

(72) Inventors: Michael Wittelsbuerger, Bamberg (DE); Matthias Fischer, Itzgrund (DE); Harald Krueger, Bamberg (DE); Michael Buchheim, Bamberg (DE); Sebastian Schoedel, Eckersdorf (DE)

(73) Assignee: Brose Fahrzeugteile GmbH & Co. Kommanditgesellschaft, Bamberg, Bamberg (DE)

( * ) Notice: Subject to any disclaimer, the term of this patent is extended or adjusted under 35 U.S.C. 154(b) by 166 days.

(21) Appl. No.: 16/318,603

(22) PCT Filed: Jul. 19, 2017

(86) PCT No.: PCT/EP2017/068266
§ 371 (c)(1),
(2) Date: Jan. 17, 2019

(87) PCT Pub. No.: WO2018/015452
PCT Pub. Date: Jan. 25, 2018

(65) Prior Publication Data
US 2019/0242171 A1 Aug. 8, 2019

(30) Foreign Application Priority Data
Jul. 20, 2016 (DE) .................. 10 2016 113 353

(51) Int. Cl.
*E05F 5/00* (2017.01)
*E05F 15/622* (2015.01)
(Continued)

(52) U.S. Cl.
CPC .............. *E05F 15/622* (2015.01); *E05F 5/00* (2013.01); *E05F 15/41* (2015.01); *E05F 15/611* (2015.01);
(Continued)

(58) Field of Classification Search
CPC ....... E05F 15/622; E05F 15/41; E05F 15/611; E05F 5/00
See application file for complete search history.

(56) References Cited

U.S. PATENT DOCUMENTS 8,020,256 B2 * 9/2011 Goller .................. E05D 11/084
16/342
8,480,155 B2 * 7/2013 Rauscher .............. E05C 17/203
296/146.4

(Continued)

FOREIGN PATENT DOCUMENTS

DE 10234371 3/2004
DE 102008005229 7/2009
(Continued)

OTHER PUBLICATIONS

"German Search Report," for Priority Application No. 102016113353.1 dated Feb. 13, 2017 (7 pages).
(Continued)

*Primary Examiner* — David M Fenstermacher
(74) *Attorney, Agent, or Firm* — Pauly, DeVries Smith & Deffner LLC

(57) ABSTRACT

The disclosure relates to a drive assembly of a closure element assembly of a motor vehicle, wherein the drive assembly comprises a drive motor and, connected to the drive motor, a feed gearing for generating linear drive movements along a geometrical drive axis, wherein the drive motor and the feed gearing are arranged in a drive train of the drive assembly and the drive train extends between (Continued)

two mechanical drive connections for putting out drive movements and wherein the drive assembly comprises a brake for braking at least a portion of the drive train. It is proposed that the brake is designed such that the braking action of the brake is reduced with an increasing load in the drive train.

20 Claims, 6 Drawing Sheets

(51) Int. Cl.
    *E05F 15/41*         (2015.01)
    *E05F 15/611*      (2015.01)

(52) U.S. Cl.
    CPC ..... *E05Y 2201/21* (2013.01); *E05Y 2201/216* (2013.01); *E05Y 2201/236* (2013.01); *E05Y 2201/248* (2013.01); *E05Y 2201/26* (2013.01); *E05Y 2800/404* (2013.01); *E05Y 2900/546* (2013.01)

(56) References Cited

U.S. PATENT DOCUMENTS

| | | | |
|---|---|---|---|
| 8,596,424 B2 * | 12/2013 | Rauscher | ............... E05C 17/22 |
| | | | 188/72.7 |
| 9,461,532 B2 * | 10/2016 | Sakai | ..................... H02K 49/06 |
| 9,473,011 B2 * | 10/2016 | Sakai | ..................... E05F 15/622 |
| 10,041,281 B1 * | 8/2018 | Miu | ....................... E05F 15/70 |
| 2010/0192328 A1 | 8/2010 | Scheck et al. | |
| 2014/0083226 A1 | 3/2014 | Sakai | |

FOREIGN PATENT DOCUMENTS

| | | |
|---|---|---|
| DE | 102014100125 | 7/2015 |
| WO | 2018015452 | 1/2018 |

OTHER PUBLICATIONS

"International Search Report and Written Opinion," for PCT Application No. PCT/EP2017/068266 dated Oct. 13, 2017 (11 pages).

* cited by examiner

DRIVE ASSEMBLY OF A CLOSURE ELEMENT ASSEMBLY

CROSS-REFERENCE TO RELATED APPLICATIONS

This application is a national stage application under 35 U.S.C. 371 of International Patent Application Serial No. PCT/EP2017/068266, entitled "Drive Arrangement of a Closure Element Arrangement," filed Jul. 19, 2017, which claims priority from German Patent Application No. DE 10 2016 113 353.1, filed Jul. 20, 2016, the disclosure of which is incorporated herein by reference.

FIELD OF THE TECHNOLOGY

The disclosure relates to a drive assembly of a closure element assembly of a motor vehicle.

BACKGROUND

The drive assembly in question finds application in the motorized movement of any closure elements of a motor vehicle. Such closure elements might be, for example, rear gates, rear hoods, engine hoods, cargo space floors, but also doors, especially sliding doors of a motor vehicle. Accordingly, the term "closure element" should be understood broadly in the present case.

The known drive assembly (DE 10 2014 100 125 A1), from which the disclosure starts, is outfitted with a drive motor and with a spindle/spindle nut gearing, connected to the drive motor. The drive assembly, moreover, comprises a brake for braking the drive train, making it possible to hold the closure element in an open position. Furthermore, there is provided in the drive train an overload clutch with two claw-like clutch elements, which disconnect the drive train in event of an overloading. In the boundary zone approaching an overload, there occurs a relative displacement of the two claw-like clutch elements with respect to each other. By virtue of their interaction, they act on the brake such that the braking action of the brake is increased. Consequently, with an increasing load in the drive train, an increasing of the braking action of the brake is achieved.

The drawback to this drive assembly is that the drive assembly in situations where it has to overcome an already large load anyway will further experience an additional load increase due to the braking force becoming stronger. This further increases the likelihood of an overload and the disconnecting of the drive train. As a result, in order to accomplish a safe operation of the drive assembly, even with rather high loads on the closure element, relatively strong and thus also costly motors need to be used, since an increased braking action needs to be overcome in addition to any already higher load present, for example due to snow lying on the closure element.

SUMMARY

Thus, the problem which the disclosure proposes to solve is to modify and design the known drive assembly such that an economically manufactured drive assembly is created, which functions reliably even under additional loads on the closure element.

The above problem is solved in a drive assembly according to the disclosure.

The major consideration is to design the brake such that the braking action of the brake is reduced with an increasing load in the drive train. As a result, in the boundary zone approaching an overload, the drive motor only has to produce a lesser torque, so that it can be designed smaller overall and thus more economically.

The basis for this consideration is the finding that the holding function for holding the closure element in an open position often needs to be provided in the upper third of the opening angle of the closure element. Because of the leverage of the closure element assembly, it turns out that the load acting on the drive train for the holding of the closure element in an open position is generally much less than the load occurring in the drive train when opening the closure element from the motor vehicle lock. This is all the more true when an additional load is resting on the closure element, such as a snow load.

This leads to the fundamental principle of the disclosure, to design the brake depending on the load. At small loads, the full braking action can be acting to realize the holding function, in particular regardless of whether these are introduced on the part of the motor or on the part of the spindle. Then, under increasing transmission torques, the brake brings about a reduction of the braking action, for example during the opening of the closure element from the motor vehicle lock. Because the braking action is reduced in the movement segments of the closure element where a larger load is acting on the drive assembly, smaller and thus more economical drive units may be used for the implementation and/or closure elements of heavier weight can be opened and/or closed with the drive assembly.

According to some embodiments, it is proposed that the braking action of the brake is reduced with an increasing load in the drive train during a motorized drive movement for opening the closure element assembly and/or during a manual drive movement for closing the closure element assembly. In particular, a reducing of the braking action is especially advantageous in this application instance, since these two application instances, namely, the motorized opening and the manual closing of the closure element are typically the application instances in which overloads will occur.

In addition or alternatively, according to some embodiments, the braking action of the brake may be reduced with an increasing load in the drive train during a motorized drive movement for closing the closure element assembly and/or during a manual drive movement for opening the closure element assembly.

In some embodiments, when the load is a torque transmitted by the drive train and/or a force acting from the outside on the drive connections, especially an axial force with respect to the drive axis. Both for the load instance of a transmitted torque and for the load instance of a force, the brake can be realized especially easily in mechanical manner. A combination of these load instances is also possible.

According to some embodiments, it is proposed to reduce the braking action of the brake continuously, especially antiproportionally, with the increasing load. This makes possible a smooth opening and/or closing movement of the closure element by means of the drive assembly.

According to some embodiments, a predefined limit load is provided, after which the brake reduces the braking action with increasing load.

According to some embodiments, the drive assembly may comprise an overload clutch, which disconnects the drive train upon an overload in the drive train. In this way, the drive assembly can be effectively protected against overload. The overload clutch can be integrated in the brake According to some embodiments, after a disconnection of the drive train by the overload clutch the brake acts only on a portion of the drive train and/or on both portions of the drive train.

Various embodiments make possible an especially simple mounting of the drive assembly.

According to some embodiments, it is proposed that the braking action is reduced as a result of an increasing load by means of a relative displacement, especially a relative rotation, of two components in the drive train, especially two components of the brake in the drive train. In some embodiments, the relative displacement of the components occurs against the spring preloading of a spring arrangement, especially along a relative displacement contour. This makes it possible to realize the reducing of the braking action in an especially simple mechanical manner.

In some embodiments, the feed gearing may be designed as a spindle/spindle nut gearing. According to some embodiments, the brake can be situated between the drive motor and the feed gearing in the drive train.

Furthermore, the above described problem is solved by a closure element assembly of a motor vehicle according to the disclosure.

In the proposed closure element assembly, the same benefits can be achieved as described above in connection with the drive assembly. All the remarks about the proposed drive assembly may be referred to.

The various modifications of the closure element assembly according to the disclosure otherwise describes an attuning of brake and the closure element assembly.

Various embodiments provide a drive assembly of a closure element assembly of a motor vehicle, wherein the drive assembly comprises a drive motor and, connected to the drive motor, a feed gearing for generating linear drive movements along a geometrical drive axis, wherein the drive motor and the feed gearing are arranged in a drive train of the drive assembly and the drive train extends between two mechanical drive connections for putting out drive movements and wherein the drive assembly comprises a brake for braking at least a portion of the drive train, wherein the brake is designed such that the braking action of the brake is reduced with an increasing load in the drive train.

In some embodiments, the braking action of the brake is reduced with an increasing load in the drive train during a motorized drive movement for opening the closure element assembly and/or during a manual drive movement for closing the closure element assembly.

In some embodiments, the braking action of the brake is reduced with an increasing load in the drive train during a motorized drive movement for closing the closure element assembly and/or during a manual drive movement for opening the closure element assembly.

In some embodiments, the load is a torque transmitted by the drive train and/or a force acting on the drive train, especially from the outside on the drive connections, especially an axial force with respect to the drive axis.

In some embodiments, the braking action of the brake is reduced continuously, especially antiproportionally, with the increasing load.

In some embodiments, a predefined, especially a lower, limit load is provided, after which the brake reduces the braking action with increasing load, wherein a predefined upper limit load is provided, after which the brake no longer reduces the braking action and/or at which the drive train is disconnected.

In some embodiments, the brake comprises at least one friction surface pair for generating the braking action, and wherein the friction surface pair is preloaded against each other by means of a spring arrangement to accomplish the braking action, wherein the preloading force of the spring arrangement is reduced in order to reduce the braking force.

In some embodiments, the drive assembly comprises an overload clutch, especially in the drive train, which disconnects the drive train upon an overload in the drive train, and wherein the overload clutch can be integrated in the brake.

In some embodiments, after a disconnection of the drive train by the overload clutch the brake acts only on a portion of the drive train, and/or wherein the brake after a disconnection of the drive train by the overload clutch acts on both portions of the drive train.

In some embodiments, the drive assembly comprises a housing and wherein one friction surface of the friction surface pair is arranged on the housing or is provided by the housing.

In some embodiments, the braking action is reduced as a result of an increasing load by means of a relative displacement, especially a relative rotation, of two components in the drive train, especially two components of the brake in the drive train, such as wherein the relative displacement of the components occurs against the spring preloading of a spring arrangement, especially along a relative displacement contour, and further wherein due to the geometry of the relative displacement contour the magnitude of the ratio of the change in braking action of the brake and the load change in the drive train can be larger for a higher load in the drive train than for a lower load.

In some embodiments, the feed gearing is a spindle/spindle nut gearing.

In some embodiments, the brake is situated between the drive motor and the feed gearing in the drive train.

Various embodiments provide a closure element assembly of a motor vehicle with a closure element adjustably coupled to the bodywork of the motor vehicle and with at least one drive assembly, such as two drive assemblies, as described herein.

In some embodiments, the drive assembly is not self-locking and the brake holds the closure element in intermediate positions when the drive motor is switched off, such as wherein the closure element is manually adjustable against the braking action of the brake when the drive motor is switched off.

BRIEF DESCRIPTION OF THE DRAWINGS

In the following, the disclosure shall be explained more closely with the aid of a drawing showing only exemplary embodiments. The drawing shows FIG. 1 in an entirely schematic representation, the rear area of a motor vehicle with a proposed drive assembly, FIG. 2 a first exemplary embodiment of a proposed drive assembly in a partly longitudinal section, FIG. 3 the exemplary embodiment from FIG. 2 in section III with a proposed brake at lesser load in a) and at higher load in b), FIG. 4 a second exemplary embodiment of a proposed brake at lesser load in a) and at higher load in b), FIG. 5 a third exemplary embodiment of a proposed brake at a lesser load in a) and at a higher load in b), FIG. 6 a fourth exemplary embodiment of a proposed brake under high compressive load in a), under lesser load in b) and under high tensile load in c).

DETAILED DESCRIPTION

Figure 1:
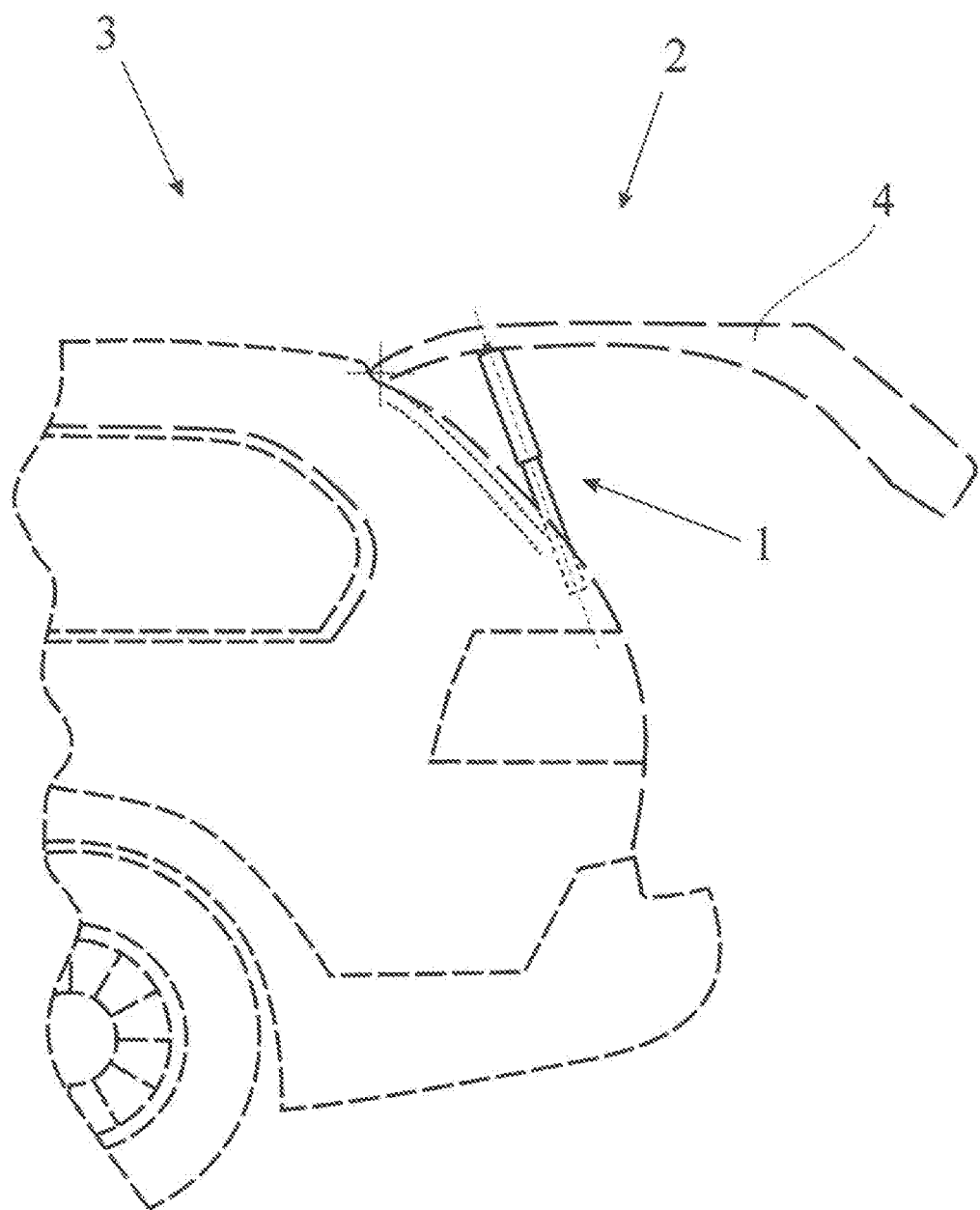

The drive assembly 1 represented in FIG. 1 is associated with a closure element assembly 2 of a motor vehicle 3. The closure element assembly 2 comprises a closure element 4 designed as a rear gate, by means of which the drive assembly 1 can be moved in particular between an open position and a closed position.

It may basically be provided here that the drive assembly 1 moves the closure element 4 only in one segment of the overall movement range of the closure element 4. In some embodiments, however, the closure element 4 is moved over at least 80%, such as at least 90%, such as at least 95% of the movement path from an open position to a closed position and/or from a closed position to an open position. For example, the closure element 4 can be moved on the last path segment into and/or out from a closed position locking the closure element 4 by means of an auxiliary closing drive and/or an auxiliary opening drive via a motor vehicle lock and in particular not the drive assembly 1.

The term "closure element" should be taken broadly in the present case. In this, reference should be made to the introductory part of the description. Accordingly, the term "closure element" means in particular those components which are associated with a closure element assembly 2 of a motor vehicle 3.

Figure 2:
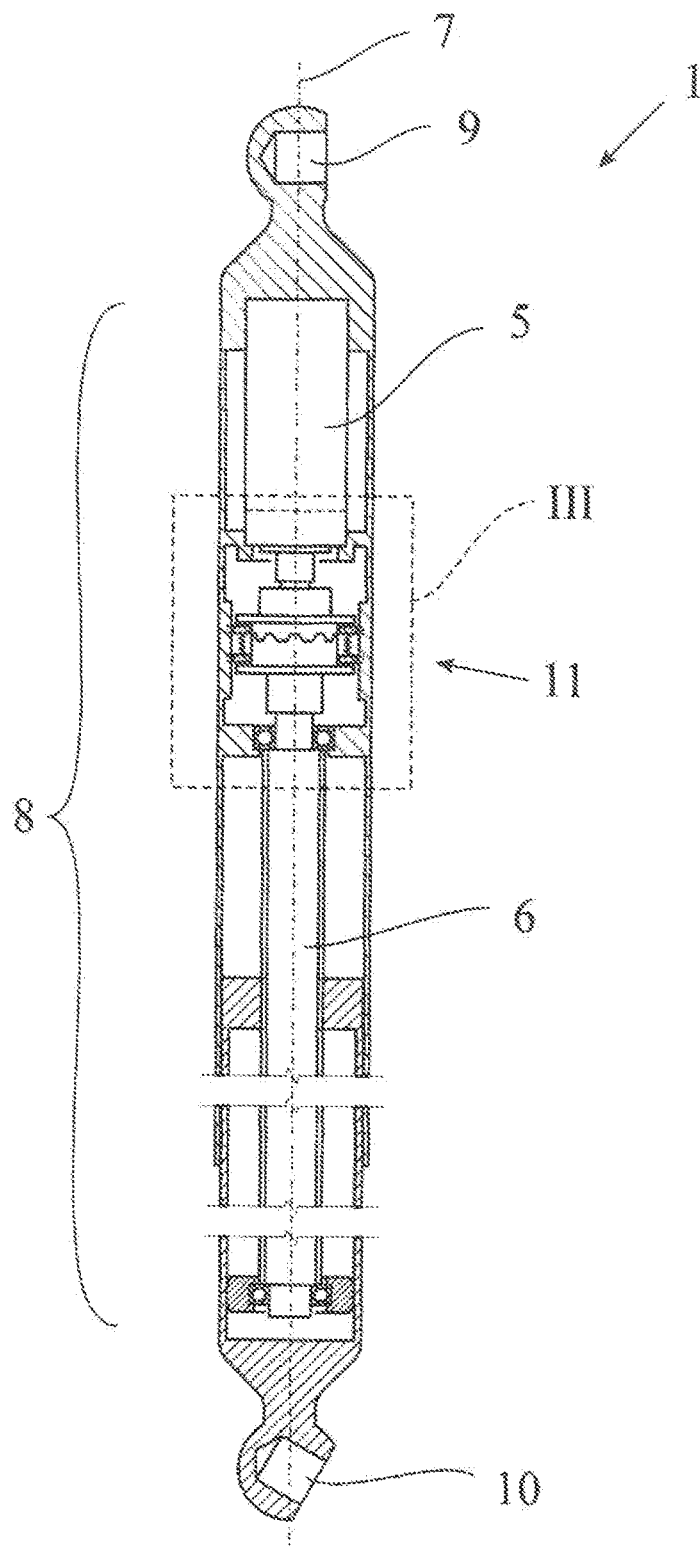

The drive assembly 1, as shown in FIG. 2, comprises a drive motor 5 and, connected to the drive motor 5, a feed gearing 6 for generating linear drive movements along a geometrical drive axis 7. The drive motor 5 and the feed gearing 6 are arranged in a drive train 8 associated with the drive assembly 1, which extends between two mechanical drive connections 9, 10. The drive connections 9, 10 here serve for putting out the drive movement to the closure element 4 and the bodywork of the motor vehicle 3.

The drive train 8 encompasses all force action chains by which a force flow is established during the motorized and/or manual movement. This includes not only all components which transmit the drive movements, but also the supporting components.

Moreover, the drive assembly 1 here has a brake 11. The brake 11 here can be situated between drive motor 5 and the feed gearing 6. In the exemplary embodiments, the drive motor 5, the feed gearing 6 and the brake 11 are accommodated in a housing 1a of the drive assembly 1.

According to the proposal, the brake 11 is designed such that the braking action of the brake 11 is reduced with an increasing load in the drive train 8. Such a design of the brake 11 is especially advantageous, since because of the characteristic leverage of a closure element assembly 2, the holding force of the drive assembly 1 is often much less than the force required for opening the closure element 4 from a motor vehicle lock, i.e., in particular on the first movement segment from the closed position. Precisely in this case the required force is especially large when in addition to the closure element 4 it is also necessary to move a snow load resting on the closure element 4.

This produces the essential advantage of the present disclosure. Because the brake 11 is designed for load-dependent braking of the drive train 8 in a manner such that the braking action of the brake 11 is reduced with an increasing load in the drive train 8, the brake 11 can brake, in some embodiments, with full braking action for holding the closure element 4 in an open position, but with an increasing load, especially an increasing transmission torque and/or an increasing axial force it can brake with a reduced braking action, especially during the opening of the closure element 4 from the closed position. This allows the use of smaller drive motors and hence a reduction in the fabrication and manufacturing costs for the drive assembly 1.

The braking action in the proposed brake 11 can be provided mechanically, especially by the sliding of friction surfaces 12a, 12b against each other. The brake 11 for this purpose has at least one friction surface pair 12 with friction surfaces 12a, 12b, which provide the braking action.

In the exemplary embodiments, the braking action of the brake 11 is reduced with an increasing load in the drive train 8 during a motorized drive movement for opening the closure element assembly 2 and/or during a manual drive movement for closing the closure element assembly 2.

In addition or alternatively, it may be provided that the braking action of the brake 11 is reduced with an increasing load in the drive train 8 during a motorized drive movement for closing the closure element assembly 2 and/or during a manual drive movement for opening the closure element assembly 2.

In some embodiments, the load is a torque transmitted by the drive train 8 and/or a force acting on the drive train 8, especially from the outside on the drive connections 9, 10, especially an axial force with respect to the drive axis 7.

Here, the braking action of the brake 11 is reduced continuously, especially antiproportionally, with the increasing load. Instead of such a linear transformation between the increase in the load and the reduction of the braking action, a nonlinear transformation may also be established between the increase in the load and the reduction of the braking action.

In some embodiments, a predefined, especially a lower, limit load is provided, after which the brake 11 reduces the braking action with increasing load. This makes it possible to provide a minimum braking action for holding the closure element 4 in a predefined load region in which the closure element 4 is reliably held by the brake 11. In addition, a predefined upper limit load may be provided, after which the brake 11 no longer reduces the braking action and/or at which the drive train 8 is disconnected.

The reduction of the braking action of the brake 11 here can be a reduction of the braking action down to a base value. Accordingly, the brake 11 can be designed for the constant braking of at least one portion of the drive train. In an alternative embodiment, however, the braking action may also be entirely abolished.

In particular, the disconnection of the drive train 8 occurs here via an overload clutch 13. This disconnects the drive train 8 when an overload occurs. The overload clutch 13 can be integrated in the brake 11, as is the case in the exemplary embodiments of FIGS. 3 and 4. However, such an overload clutch 13 may also be provided independently of the brake 11, as is the case in the exemplary embodiments of FIGS. 5 and 6.

In some embodiments, the overload clutch 13 divides the drive train 8 into two portions. After the disconnection of the drive train 8, the brake 11 can act only on a portion of the drive train 8. However, after the disconnection of the drive train 8 the brake 11 may also act on both portions of the drive train 8.

Furthermore, a predefined upper limit load can be defined, after which the braking action of the brake 11 is abolished and/or not further reduced. The limit load here can be a force and/or a torque.

In the exemplary embodiments, the brake 11 comprises at least one friction surface pair for generating the braking action. One friction surface 12a is arranged on a rotatable component 16, 17 of the brake 11 and the friction surface 12b mating with this friction surface 12a is arranged so as to be rotationally fixed, especially on the housing 1a of the drive assembly 1.

Here, the friction surface pair 12 can be preloaded against each other by means of a spring arrangement 14. Here the preloading force of the spring arrangement 14 is reduced in order to reduce the braking force.

In the following, at first the exemplary embodiment of FIG. 3 shall be described.

Figure 3:
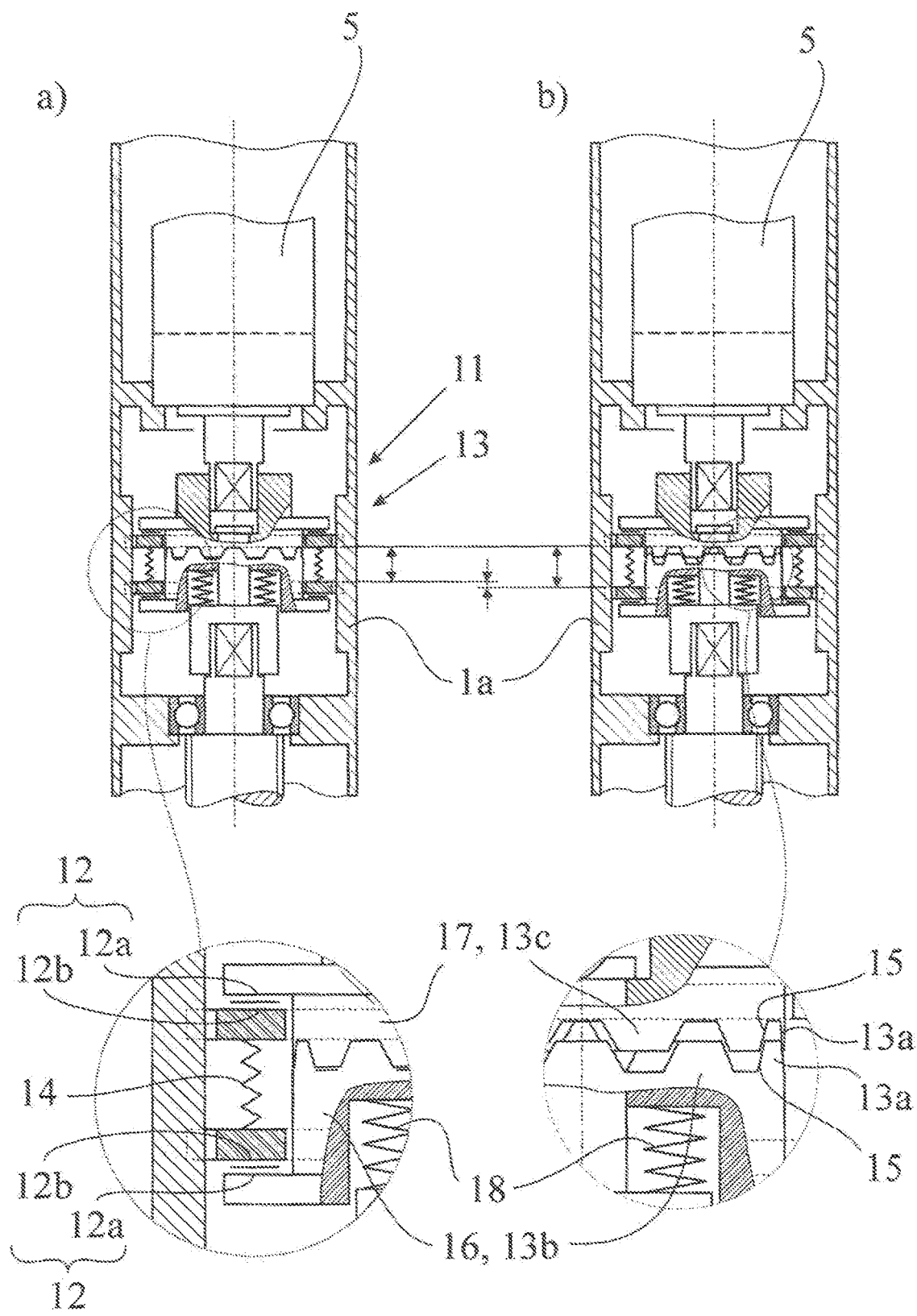

FIG. 3a shows the brake 11 under a low load. The overload clutch 13 integrated in the brake 11 here can be designed as a claw clutch. The claws 13a of the overload clutch 13 have slanting surfaces, which allow the claws 13a to slide against each other under an increasing load, as in FIG. 3. Accordingly, these slanting surfaces form relative displacement contours 15. Now, with increasing load, as shown in FIG. 3b, at least one component 16, being here the claw element 13b, moves away with respect to another component 17, being here the other claw element 13c. This takes place against the preloading force of the spring arrangement 18 of the overload clutch 13—the clutch spring arrangement. The components 16, 17 move apart under increasing load, as is shown in FIG. 3. In this way, the spring arrangement 14 of the brake 11 relaxes. The friction surface pairs 12 of the brake 11 move away from each other and the spring preloading of the spring arrangement 14 is reduced. Accordingly, the resulting braking action decreases.

The moving apart of the friction surface pairs 12 of the brake 11 is made possible here in that one of the friction surfaces 12b of a friction surface pair 12 is rotationally fixed, yet able to be displaced along the drive axis 7, and a mating friction surface 12b of the friction surface pair 12 is able to be displaced and/or rotate along the drive axis 7 with the component 16.

At the moment when the relative displacement contours 15 in the exemplary embodiment of FIG. 3 are disengaged from each other, the overload clutch 13 is activated and disconnects the drive train 8. Nonetheless, the brake 11 continues to provide a reduced braking action.

The load reducing the braking action here is a torque. The relative displacement of the components, here, can be a rotation about the directional vector of the load, especially the load torque, and/or an axial displacement along the directional vector of the load, especially the load torque. The components 16, 17 here move away from each other.

Figure 4:
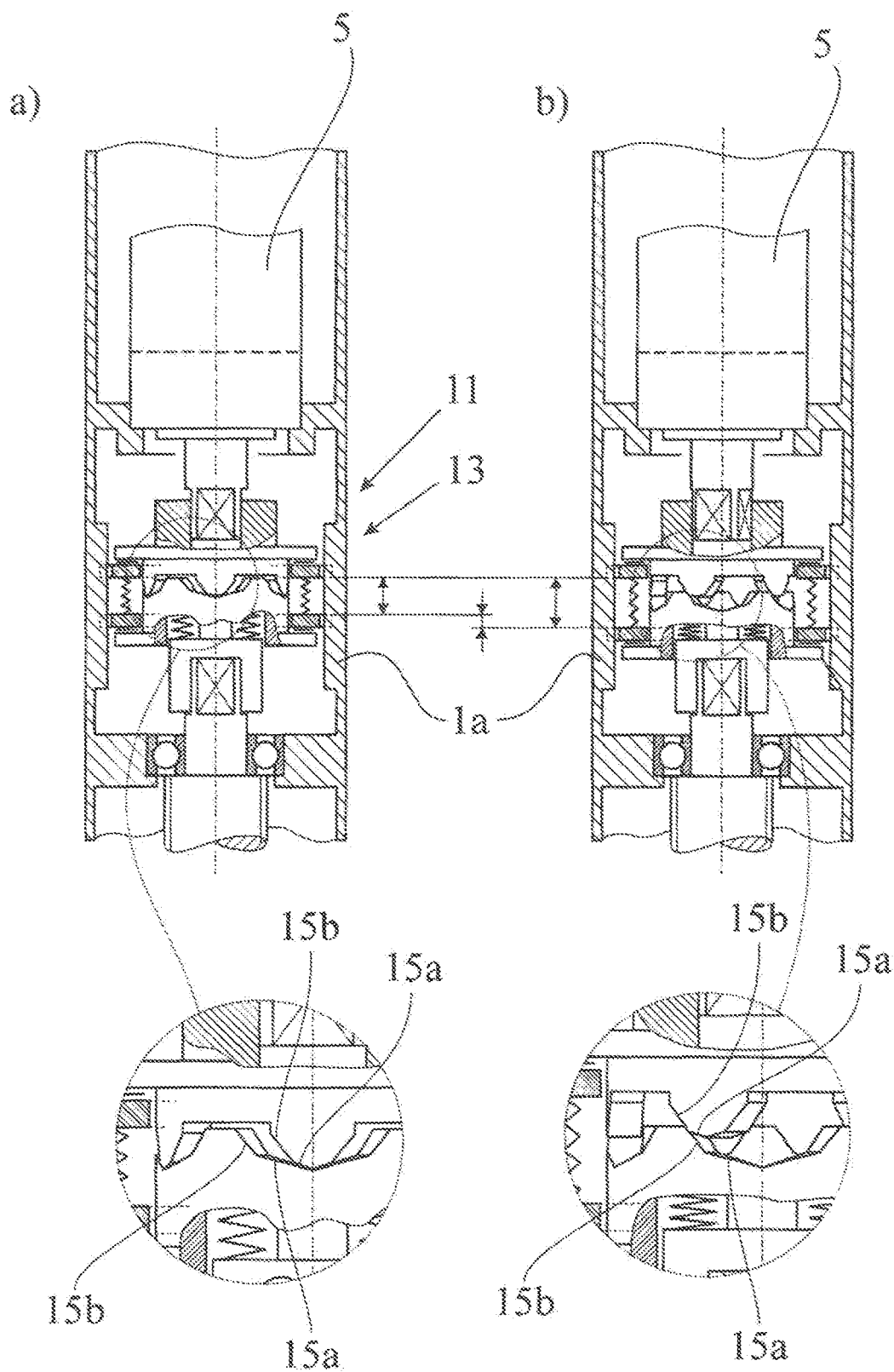

The exemplary embodiment of FIG. 4 corresponds for the most part to that of FIG. 3. Accordingly, refer to the description of the exemplary embodiment of FIG. 3 for the construction and mode of functioning.

In the exemplary embodiment of FIG. 4, however, the relative displacement contours 15 have a different configuration. Instead of a single linear section, here they can have two linear sections of different slope. It is then possible to reduce the braking action of the brake 11 less on a first section 15a of the relative displacement contours 15 with lesser slope than on a second section 15b with larger slope. By the slope is meant here the slope of the relative displacement contours 15 with respect to a plane orthogonal to the drive axis 7.

The mating relative displacement contours 15 of the two components 16, 17 here comprise sections 15a, 15b of the same slope. These may have the same length, as shown in FIG. 3, or a different length, as shown in FIG. 4. In the case of different length of the sections 15a, 15b, such as at least one section 15a, 15b is longer than the mating section 15a, 15b to this section 15a, 15b. In some embodiments, the mating sections 15a of lesser slope are of different length. Thanks to sections 15a, 15b of different length, the reduction of the braking action can be especially easily adjusted by the slope in relation to the load increase. In some embodiments, the braking action on a first section is reduced less in relation to a load increase than on a second section of the relative displacement contour 15.

Figure 5:
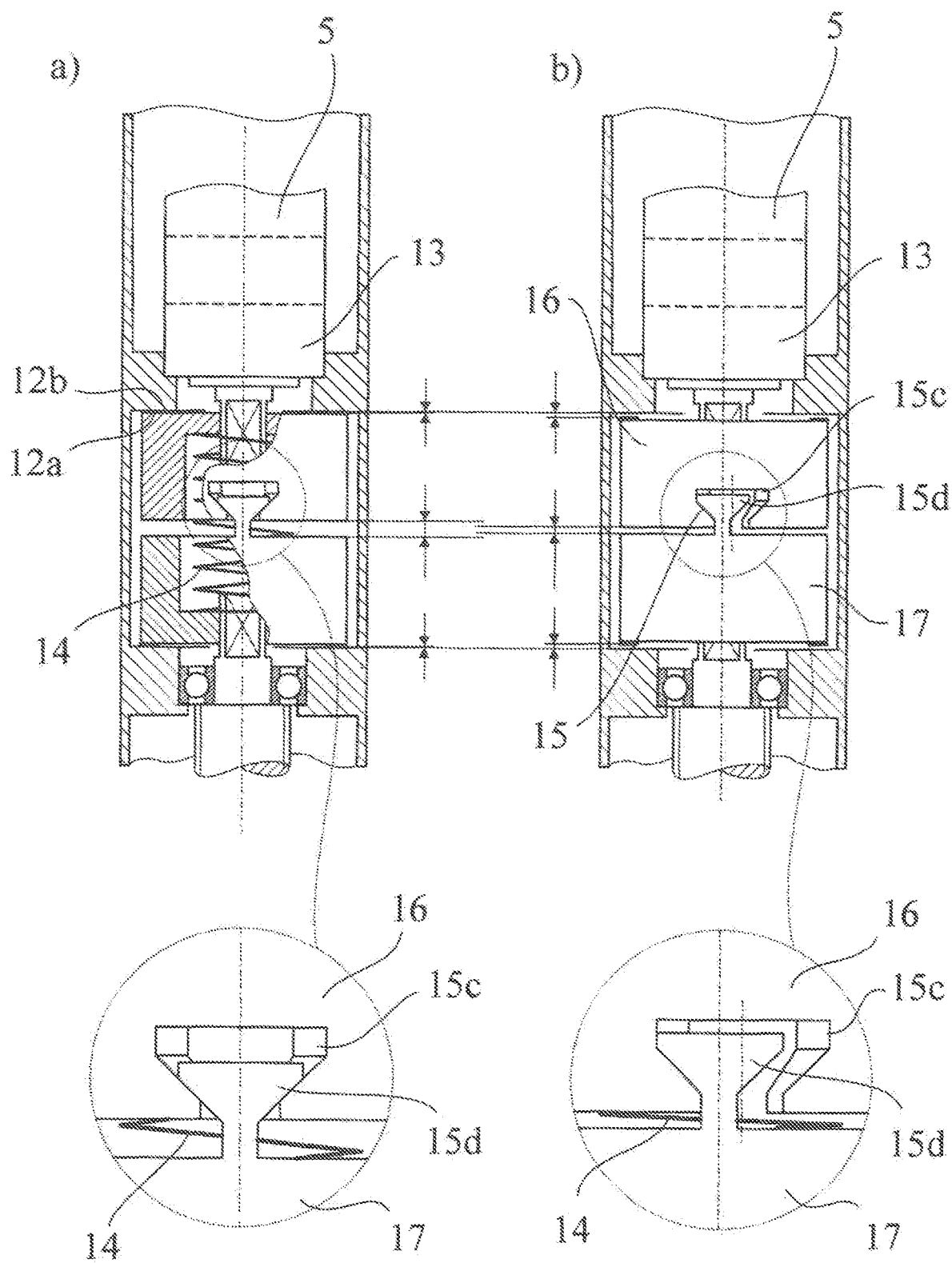

The further exemplary embodiment of FIG. 5 also shows a similar basic principle. Here as well, the load by which the braking action of the brake 11 is reduced is a torque. Here as well, the braking action is reduced mechanically.

Here as well, two components 16, 17 can be configured as pots, can be displaced relative to each other in dependence on the load, thereby reducing the braking action. For the two components 16, 17, the relative displacement contours 15 here are fashioned in the manner of a recess 15c and a lug 15d engaging with it. As in the exemplary embodiments of FIGS. 3 and 4, the relative displacement contours 15 run at an angle to the drive axis 7. They do not intersect it here. In some embodiments, the angle between the relative displacement contour and the drive axis 7 is between 30° and 60°.

However, the two components 16, 17 here, by contrast with the embodiment of FIG. 3 or FIG. 4, cannot be separated by the load in the installed state. Moreover, the two components 16, 17 here move toward each other under increasing load.

Here, the relative displacement of the components 16, 17, reducing the braking action, is a rotation about and/or an axial displacement along the directional vector of the load, especially the load torque. The spring arrangement 14, which is accommodated here in the pots, is more strongly tensioned and the friction surfaces 12a of the rotating components 16, 17 move away from the friction surfaces 12b of the housing 1a, which are especially fixed in place. This relative displacement of the components 16, 17 is shown in FIG. 5. Here, the two components 16, 17 move toward each other.

Similar to the exemplary embodiment of FIG. 3 or 4, a spring mounting of the friction surfaces 12a in the housing can also be provided in the exemplary embodiment of FIG. 5. Then the friction surfaces 12 can be rotationally fixed, yet able to be displaced along the drive axis 7.

Here, as in the configuration of the exemplary embodiments of FIGS. 3 and 4, it is provided that one of the components 16, 17, especially the components 16, 17, can slide with play along the drive axis 7 on a shaft connection at the drive motor side and/or the feed gearing side. Accordingly, the brake 11 can be mounted floating between the drive motor 5 and the feed gearing 6, as can also be the case in the exemplary embodiment of FIG. 6.

Figure 6:
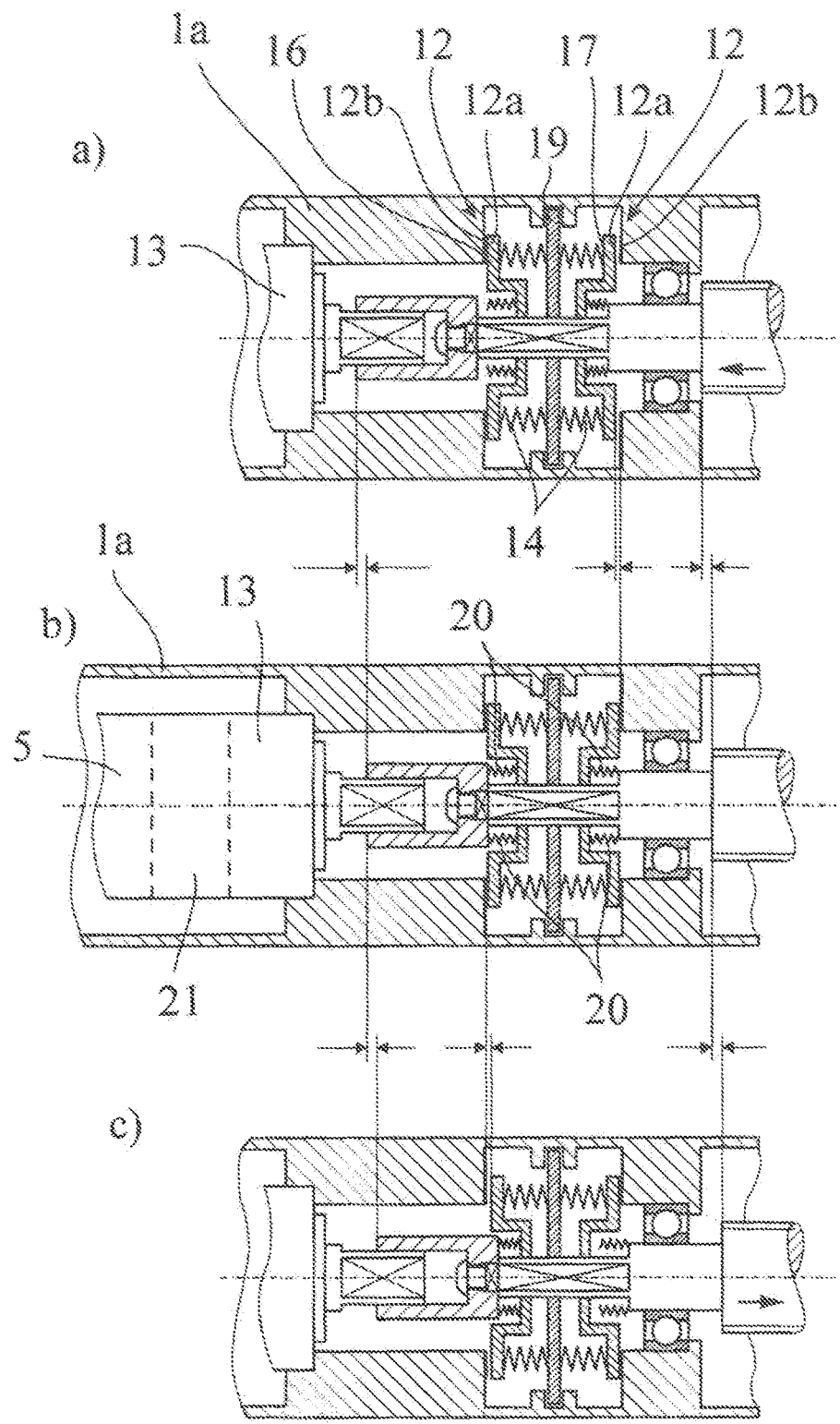

In the exemplary embodiment of FIG. 6, the reduction of the drive force occurs in dependence on an axial force as the load and not in dependence on a torque as the load. Basically, a combination of the mechanisms of the brakes 11 described in the exemplary embodiments is also possible, such that the load for adjusting the braking action is a combination of an axial force and a transmitted torque.

Also in the exemplary embodiment of FIG. 6 the components 16, 17 are provided, being designed rotatable with the drive motor 5. These also comprise the friction surfaces 12a here. The mating friction surfaces 12b are designed on the housing 1a. Likewise in this case, a relative displacement due to an increasing load of the components 16, 17, designed here as disks and/or plates, brings about a reducing of the braking action. In some embodiments, at least one component 16, 17 here is displaced parallel to the directional vector of the load, here, the axial tensile force and/or axial compressive force.

The components 16, 17, as in the previously described exemplary embodiments, are rotationally coupled to the drive motor 5. Here, they are mounted on a shaft and are axially displaceable. The bearing system here is the bearing spring arrangement 20. Alternatively, instead of this spring mounting, end stops may also be provided, which only allow an axial displacement of the components 16, 17 in one direction along the drive axis from one position, especially a load-free position (see FIG. 6b). Here, the components 16, 17 move toward each other.

The friction surface pairs 12 here are preloaded against each other by means of a spring arrangement 14. The spring arrangement 14 here is braced against an element 19 which rotates along with the components 16, 17, being mounted axially and rotatably in the housing 1a.

In FIG. 6b, the brake 11 is shown in a load-free state. Now, if the drive train 8 is loaded with an axial compressive load, the feed gearing 6 will move toward the drive motor 5, as is shown in FIG. 6a. In this way, the component 17 moves toward the component 16. The component 16, on the other hand, will not move in the axial direction, since it is stopped against the housing 1a by the friction surface pair 12.

The braking force between a friction surface pair 12, shown here at the right, is reduced in that the pressing force of the friction surface 12a is reduced. The pressing force on the other friction surface pair 12, shown here at the left, on the other hand can remain constant for the most part.

The exerting of a compressive force on the drive train 8 corresponds here to a motorized drive movement for the opening of the closure element assembly 2 or a manual drive movement for the closing of the closure element assembly 2.

If a tensile force is exerted on the drive train 8, the same action in the reversed manner will occur, as described in connection with the compressive force. Only the other component 16 will be moved toward the component 17, while the component 17 does not move axially. Accordingly, refer to the above remarks. This load situation corresponds to a motorized drive movement for the closing of the closure element and/or a manual drive movement for the opening of the closure element assembly 2. In this case, as shown in FIG. 6c, the braking action of the one friction surface pair, shown here at the left, is reduced, while here the braking force of the other friction surface pair 12, shown here at the right, remains substantially constant.

This relative displacement of the components 16, 17 is shown in FIG. 6 for the load-free state (FIG. 6b), the state under a compressive load (FIG. 6a) and the state under a tensile load (FIG. 6c).

In further exemplary embodiments not represented in the figures, it is also possible to provide each time only one of the friction surface pairs described above in connection with FIG. 6. In this case, the proposed reduction of the braking action with increasing load will result only for one loading direction, namely, either the compressive force or the tensile force.

The curve for reducing the braking action as a function of the load may be easily realized in all four exemplary embodiments by the dimensioning of the spring arrangements 14, 18, 20, especially with respect to the spring arrangement 14 for the clutch spring arrangement 18 or the bearing spring arrangement 20.

As is apparent from the foregoing explanation of the four exemplary embodiments, what is common to them all is that the braking action is reduced as a result of an increasing load by means of a relative displacement, especially a relative rotation, at least in the exemplary embodiments of FIGS. 3, 4 and 5, of two components 16, 17 in the drive train 8, especially two components 16, 17 of the brake 11 in the drive train 8. Here, this occurs by a relative displacement of the components 16, 17 against a spring preloading of a spring arrangement 14, 18, especially along a relative displacement contour 15. The relative displacement contours 15 here can be linear in configuration. They may also comprise multiple linear sections. Alternatively, they may comprise an evolvent contour. With regard to the possible configuration of the relative displacement contours 15, refer to the remarks in this regard in connection with the exemplary embodiment of FIG. 4. The relative displacement contours 15 may also be designed accordingly in other configurations in order to adjust the reduction of the braking action in relation to the load increase. In some embodiments, due to the geometry of the relative displacement contour 15, the magnitude of the ratio of the change in braking action of the brake 11 and the load change in the drive train 8 is larger for a higher load in the drive train than for a lower load.

In the exemplary embodiments, the feed gearing 6 is designed as a spindle/spindle nut gearing. With this gearing, rotation movements can be especially easily transformed into linear movements or linear movements into rotation movements.

It is also possible to arrange between the drive motor 5 and the feed gearing 6, especially between the drive motor 5 and the brake 11 and/or the overload clutch 13, a reduction gearing 21, which slows down the rotary speed of the drive motor 5. This is designed here as a planetary gearing.

According to a further teaching, a closure element assembly 2 of a motor vehicle is described, comprising a closure element 4 adjustably coupled to the bodywork of the motor vehicle 3 and at least one drive assembly 1 of the above described kind. In some embodiments, two drive assemblies 1 of the above described kind are provided, one arranged on either side of the closure element 2.

It has proven to be especially advantageous when the drive assembly 1 is not self-locking and the brake 11 holds the closure element 4 in intermediate positions when the drive motor 5 is switched off. In some embodiments, the closure element 4 is adjustable for its manual movement against the braking action of the brake 11 when the drive motor 5 is switched off.

The invention claimed is:

1. A drive assembly of a closure element assembly of a motor vehicle, wherein the drive assembly comprises a drive motor and, connected to the drive motor, a feed gearing for generating linear drive movements along a geometrical drive axis,
   wherein the drive motor and the feed gearing are arranged in a drive train of the drive assembly and the drive train extends between two mechanical drive connections for putting out drive movements and
   wherein the drive assembly comprises a brake for braking at least a portion of the drive train,
   wherein the brake is designed such that the braking action of the brake is reduced with an increasing load in the drive train.

2. The drive assembly as claimed in claim 1, wherein the braking action of the brake is reduced with an increasing load in the drive train during a motorized drive movement for opening the closure element assembly and/or during a manual drive movement for closing the closure element assembly.

3. The drive assembly as claimed in claim 1, wherein the braking action of the brake is reduced with an increasing load in the drive train during a motorized drive movement for closing the closure element assembly and/or during a manual drive movement for opening the closure element assembly.

4. The drive assembly as claimed in claim 1, wherein the load is a torque transmitted by the drive train and/or a force acting on the drive train from the outside on the drive connections.

5. The drive assembly as claimed in claim 1, wherein the braking action of the brake is reduced continuously with the increasing load.

6. The drive assembly as claimed in claim 1, wherein a predefined lower limit load is provided, after which the brake reduces the braking action with increasing load.

7. The drive assembly as claimed in claim 1, wherein the brake comprises at least one friction surface pair for generating the braking action, and wherein the friction surface pair is preloaded against each other by a spring arrangement to accomplish the braking action.

8. The drive assembly as claimed in claim 1, wherein the drive assembly comprises an overload clutch which disconnects the drive train upon an overload in the drive train.

9. The drive assembly as claimed in claim 8, wherein after a disconnection of the drive train by the overload clutch the brake acts only on a portion of the drive train, and/or wherein the brake after a disconnection of the drive train by the overload clutch acts on both portions of the drive train.

10. The drive assembly as claimed in claim 7, wherein the drive assembly comprises a housing and wherein one friction surface of the friction surface pair is arranged on the housing or is provided by the housing.

11. The drive assembly as claimed in claim 1, wherein the braking action is reduced as a result of an increasing load by a relative displacement of two components in the drive train.

12. The drive assembly as claimed in claim 1, wherein the feed gearing is a spindle/spindle nut gearing.

13. The drive assembly as claimed in claim 1, wherein the brake is situated between the drive motor and the feed gearing in the drive train.

14. A closure element assembly of a motor vehicle with a closure element adjustably coupled to the bodywork of the motor vehicle and with at least one drive assembly as claimed in claim 1.

15. The closure element assembly as claimed in claim 14, wherein the drive assembly is not self-locking and the brake holds the closure element in intermediate positions when the drive motor is switched off.

16. The drive assembly as claimed in claim 6, wherein a predefined upper limit load is provided, after which the brake no longer reduces the braking action and/or at which the drive train is disconnected.

17. The drive assembly as claimed in claim 7, wherein the preloading force of the spring arrangement is reduced in order to reduce the braking force.

18. The drive assembly as claimed in claim 8, wherein the overload clutch is integrated in the brake.

19. The drive assembly as claimed in claim 11, wherein the relative displacement of the components occurs against the spring preloading of a spring arrangement, especially along a relative displacement contour.

20. The drive assembly as claimed in claim 19, wherein due to the geometry of the relative displacement contour the magnitude of the ratio of the change in braking action of the brake and the load change in the drive train is larger for a higher load in the drive train than for a lower load.

* * * * *